Dec. 2, 1958   A. WILLIAMS   2,862,216
SHOES AND METHODS OF MAKING SAME
Filed Nov. 23, 1956   3 Sheets-Sheet 1
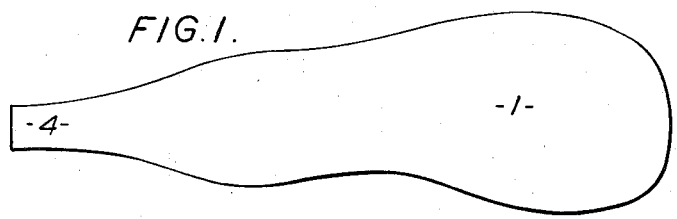
FIG.1.
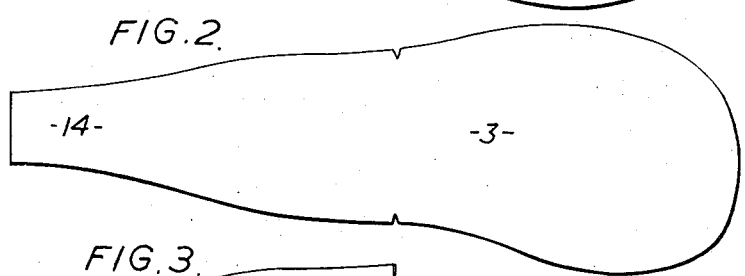
FIG.2.
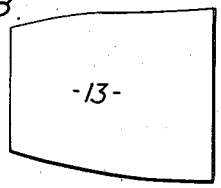
FIG.3.
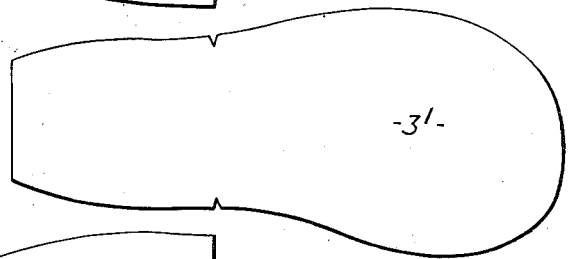
FIG.4.
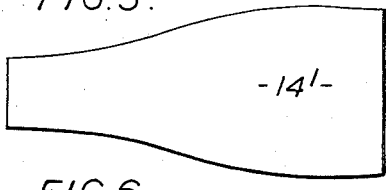
FIG.5.
FIG.6.
FIG.7.
FIG.8.
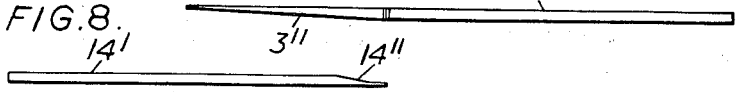
Inventor
Alfred Williams
By
Porter Chittick & Russell
Attorneys

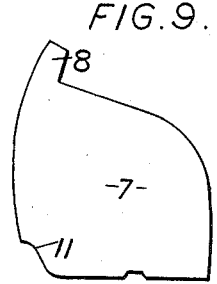
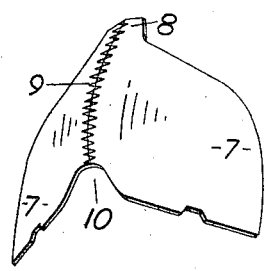
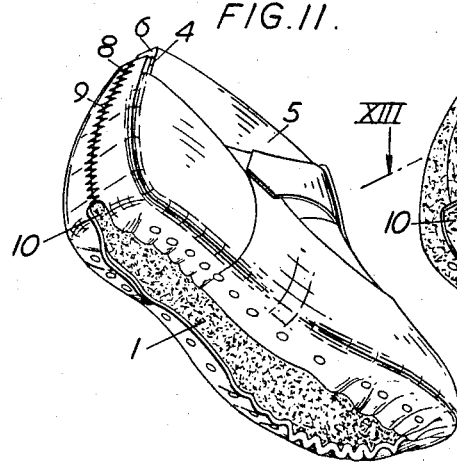
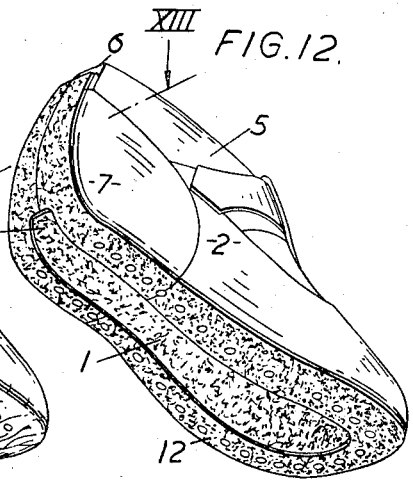
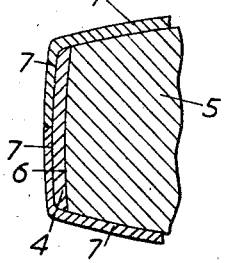

Dec. 2, 1958 A. WILLIAMS 2,862,216
SHOES AND METHODS OF MAKING SAME
Filed Nov. 23, 1956 3 Sheets—Sheet 3
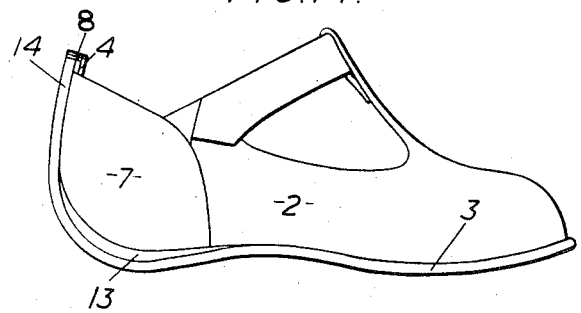
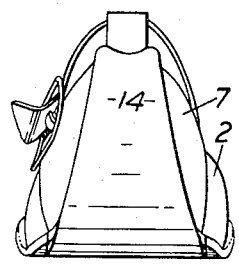
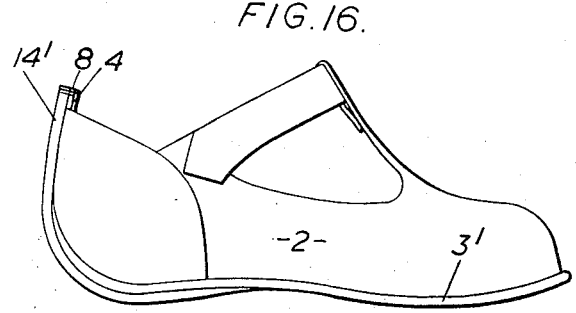
Inventor
Alfred Williams
By
Porter, Chittick & Russell
Attorneys

United States Patent Office 2,862,216
Patented Dec. 2, 1958

2,862,216

SHOES AND METHODS OF MAKING SAME

Alfred Williams, London, England, assignor to Toddlers Footwear (1954) Limited, London, England Application November 23, 1956, Serial No. 624,108

Claims priority, application Great Britain November 30, 1955

1 Claim. (Cl. 12—142)

This invention relates to shoes and methods of making same, and has for its general object to provide shoes (which term is used broadly and is not intended herein to exclude boots or bootees) adapted to give strength and support at the heel without the use of normal heel stiffeners.

More especially the invention may be said to concern shoes of the kind comprising an exterior part, generally of thicker material than is usually employed in an upper, extending up the back of the shoe as well as underneath it, this part forming either a long sole extending from the toe to substantially the top of the heel of the shoe, or an extended heel piece.

A further object of the invention is to provide a strong and effective shoe of this kind which may be durable and comfortable in wear. The invention is especially applicable, although not confined thereto, to infants' or childrens' shoes.

The invention provides an improved shoe comprising an upper of any usual pattern, but with quarters adapted when joined together to form an opening at the bottom permitting them to be there folded over smoothly at the rear on to a last, an insole adapted to extend from toe substantially to the top of the joined quarters at the back and adhesively affixed inside said quarters, and a similarly long outer sole attached by adhesive at the bottom to the insole and the edges of the upper, and at the back of the shoe to roughed up surfaces of the quarters substantially the top thereof. The quarters may be characterized by each having a part extending upwardly at the rear above the normal level, and the insole and sole both be adapted to extend and be affixed substantially as far as the top of the extension so formed. A wedge may be interposed at the heel between sole and insole. Moreover either or both insole and sole may initially be formed in two pieces adapted to be joined neatly by adhesive.

In order that the invention may be clearly understood and readily carried into effect, the same will now be described with reference to the accompanying illustrative drawings, wherein:

Fig. 1 is a plan view of a long or extended insole adapted to extend from the toe substantially to the top of an extension formed at the top of the rear part of joined quarters.

Fig. 2 is a like view of a similar long sole,

Fig. 3 is a plan view of a heel wedge,

Figs. 4 and 5 show a long sole initially formed in two pieces, in other words as a sole and an extended heel piece, said two pieces being adapted to be joined neatly by adhesive, Fig. 6 is a side view of the heel wedge, Fig. 7 is a side view of the sole shown in Fig. 4, Fig. 8 is a side view of the heel piece shown in Fig. 5, Fig. 9 is an elevation of a short quarter, characterized by an extension at the top, and a portion cut away at the bottom rear, Fig. 10 is a perspective view of a pair of quarters joined together by a stitched seam, Fig. 11 is a perspective view of an upper with a long insole in position after lasting on a last appropriately formed for carrying out the present invention, Fig. 12 is a similar view of the same after roughing up in preparation for securing a long sole by adhesive, Fig. 13 is an enlarged cross section through the rear portion of last, insole and quarters substantially on the line XIII—XIII of Fig. 12, Fig. 14 is a side elevation of one form of sandal type shoe according to the invention, embodying a heel wedge and a long sole extending up the back, Fig. 15 is a rear view of a similar shoe, and Fig. 16 is a side elevation of a shoe embodying a long sole initially formed in two pieces, as a sole and heel piece.

The method of making may be described first with reference to the simplest form which comprises a single insole 1 which may conveniently be shaped substantially as shown in Fig. 1 affixed to the inside of an upper indicated generally by the number 2 and a single long outersole 3 Figs. 2 and 14 affixed to the outside of the upper.

The insole 1, preferably skived thin at the extended end 4, is initially shaped to conform to the bottom and back part of a last 5 which has a substantially flattened surface 6 (see Fig. 13) more or less tapering up the back of the heel to the narrowest part at the top, and is then fitted into an upper 2 of any time e. g. sandal, Gibson (eyeletted) or bootee type, and having quarters 7, which may be long, short or even formed integrally with the forepart of the upper, each formed with an extension 8 at the top of the rear part, and so shaped at the bottom that when joined together at a central stitched seam 9 (Fig. 10) at the rear they form a more or less V-shaped opening 10 with outwardly curved arms 11 so that they can be folded over smoothly onto the last 5. The insole 1 is then fixed inside the rear of the quarters 7 of the upper 2 by adhesive.

The appropriately shaped last 5 above mentioned is then inserted into the upper 2 in correct position for lasting the upper to the insole. The lasting may be effected in any usual or convenient manner such as by a Consol lasting machine or by hand with tacks (tacks being shown in Figs. 11 and 12), and/or adhesive.

When lasted as shown for example in Fig. 11 the upper 2 is roughed up as shown in Fig. 12 all round the lasted edge 12 at the bottom of the last and up the back of the last to the shape of a feather edge created by the shape of the back and heel of the above mentioned last. Although this roughing up, compare Figs. 11 and 12, may be expected to break the stitches 9 that initially united the two quarters 7 at the back, the upper 2 does not there become loose or fall apart because it was previously affixed to the part 4 of the insole 1 extending up the back, and remains secure upon the last 5 for the next operation.

The next operation consists in attaching the single long outer sole 3 to the upper 2, preferably with an interposed heel wedges 13 (Figs. 3, 6 and 14) of appropriate shape and skived at each end. For this purpose the sole 3 is preferably previously roughed up, and after adhesive has been applied is fitted into position with the top of the rear part 14 thereof substantially level with the extension 8 of the upper end 4 of the insole 1 previously mentioned, preferably after inserting a wedge 13 at the heel.

To ensure security in wear the long sole 3 is preferably well hammered or pressed to the shoe on the last all over the bottom and up the rear part 14.

The complete sole 3, and wedge 13 if present, can then be trimmed to conform generally more closely to the shape of the bottom and back of the specially designed last 5 aforementioned, and the extension formed at the top of the rear part of the shoe, now consisting of part of the upper, insole and sole is then trimmed off or into required shape, as shown for example in Figs. 14 to 16, by a tool designed so to shape the top of these parts that the shoe will be comfortable in wear.

The method above described is also applicable using an insole initially formed in two pieces and/or an outer sole initially formed in two pieces, instead of the single long insole 1, 4 and a single long outer sole 3, 14 above mentioned. In each case the sole piece would extend to the rear under the heel as usual and be skived at its rear end, and an extended heel piece with a part to extend up the back of the heel would be skived at its front end, so that the two pieces could afterwards be joined neatly by adhesive. Where such a shorter outer sole is used with an extended heel piece, a heel wedge 13 is usually unnecessary.

Figs. 4, 5, 7 and 8 illustrate an outer sole formed initially in two pieces 3' and 14' adapted by skiving to be joined neatly by adhesive and in the case of the sole part 3' the skiving would also roughen what might normally be a smooth outer surface. The skived portion of the sole part 3' is indicated at 3" and that of the extended heel piece part 14' at 14"; they preferably overlap about the amount indicated by those figures to ensure a neat and firm joint. Clearly an insole could be likewise formed in two pieces.

Figs. 14 and 16 also show that the heel wedge 13 or the sole piece 3' may extend a little way up behind the heel.

The edges of the sole, and wedge or extended heel piece as the case may be, can be trimmed to conform somwhat more closely to the shape of the bottom and back of the last, and consequently to the shape assumed by the adjacent parts of the upper than Fig. 15 indicates.

The insole and outer sole, whether in one or two pieces, may be made of any usual or appropriate material, such as leather, a leather substitute, or rubber. In the case of rubber soles, these may initially be moulded to substantially the desired form, and be attached by adhesive solution or fitted by any known vulcanising process or other method.

Obviously, if desired, other parts usual in shoe construction may be employed, such as socks, heel lifts or mid-soles, and linings or partial linings (which may be merely edge strengthening or foot grip strips) where appropriate in the quarters, without departure from the invention.

It may be noted it is entirely novel that although stitches 9 uniting the quarters 7 at the rear are broken, by a roughing up operation, the shoe upper 2 remains intact upon the last owing to prior internal fixture of the quarters 7 thereof up the back to a long extended insole 1 or an internal heel piece with extension (not shown).

It may be seen that the invention may also be said to consist in an improved shoe, that can be made by a method substantially as above described. Such an improved shoe may comprise, for example, an upper 2 generally of any usual pattern, but with quarters 7 characterised by each having a part 8 extending upwardly at the rear above the normal level, and of such shape as, when joined together, to form an opening 10 at the bottom permitting the quarters 7 to be there folded over smoothly onto a last 5 appropriately shaped at the rear, an insole 1 adapted to extend from the toe substantially to the top of the upward extension 8 at the back of joined quarters 7 and adhesively affixed to said quarters, and a similarly long outer sole 3 attached by adhesive to the insole 1 and edges 12 of the upper 2 at the bottom of the shoe, and at the back of the shoe to roughened up surfaces of the quarters 7 substantially to the top of the upward rear extension 8 thereof.

Obviously, an improved shoe in accordance with the invention may be formed with what was initially a two piece insole and/or a two piece outer sole, each comprising a sole piece as 3' and an extended heel piece as 14", afterwards joined together. Also other parts may be included as hereinbefore indicated.

"Adhesive" and similar terms are used herein to cover anything adapted to stick parts together, such as rubber solutions, vulcanising processes (in the case of rubber), and shoe cements or the like.

I claim:

A method of making a shoe having an upper with quarters, comprising, fitting a long insole to extend to the top of the heel of the quarters of the upper, affixing said insole to the inside of the rear of said quarters solely by adhesive up the back portion thereof, inserting a last into the upper with the last in engagement with the insole and with the inner surfaces of the sides of the quarters, lasting the upper to the insole leaving a surface of the insole exposed centrally between the lasted edges of the upper, roughing-up the outer surface of the lasted edges along the underside of the upper and the back of the quarters and the surface of the insole exposed between the lasted edges of the upper, and attaching solely by adhesive a long outer sole to the roughened surfaces of the upper and insole and the back of the quarters with the top of the rear part of the outer sole substantially even with the adjacent tops of the quarters and insole.

References Cited in the file of this patent

UNITED STATES PATENTS

| | | |
|---|---|---|
| 2,472,987 | Rizzo | June 14, 1949 |
| 2,554,075 | Vigorith | May 22, 1951 |
| 2,563,303 | Ayers | Aug. 7, 1951 |
| 2,607,131 | Everston | Aug. 19, 1952 |
| 2,635,361 | Ayers | Apr. 21, 1953 |
| 2,677,903 | Gaguin | May 11, 1954 |

FOREIGN PATENTS

| | | |
|---|---|---|
| 143,337 | Sweden | Dec. 15, 1953 |